United States Patent Office 3,435,062
Patented Mar. 25, 1969

3,435,062
WATER-INSOLUBLE MALONONITRILE-DERIVED STYRYL DYESTUFFS
Christopher David Marrable, Manchester, England, assignor to Imperial Chemical Industries Limited, London, England, a corporation of Great Britain
No Drawing. Filed Sept. 8, 1966, Ser. No. 577,797
Claims priority, application Great Britain, Sept. 16, 1965, 39,585/65; Apr. 13, 1966, 16,178/66
Int. Cl. C07c *121/00*
U.S. Cl. 260—465                                2 Claims

ABSTRACT OF THE DISCLOSURE

Water-insoluble styryl dyestuffs of the formula

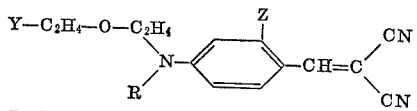

wherein R is a lower alkyl radical; Z is hydrogen or lower alkyl, Y is one of the following groups

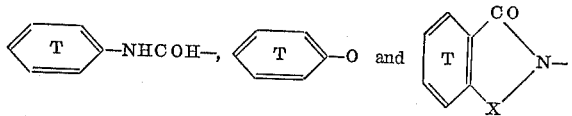

wherein X is —CO— or —$SO_2$— and the benzene ring T may contain the following substituents, chlorine, bromine, nitro, cyano, lower alkyl, lower alkoxy, lower alkylsulphonyl, carbo lower alkoxyl, carbonamido, acetyl, phenyl and phenoxy are valuable for colouring synthetic textile materials such as cellulose acetate textile materials, polyamide textile materials or aromatic polyester textile materials.

---

This invention relates to new dyestuffs and more particularly it relates to new water-insoluble styryl dyestuffs which are valuable for colouring synthetic textile materials.

According to the invention there are provided the water-insoluble styryl dyestuffs of the formula:

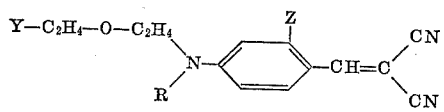

wherein R represents a lower alkyl radical, Z represents a hydrogen atom or a lower alkyl radical, and Y represents a group of the formula

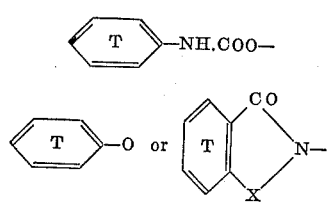

wherein X represents —CO— or —$SO_2$—, and the benzene ring T may contain substituents other than sulphonic acid or carboxylic acids groups, or may form part of a naphthalene ring.

Throughout this specification the terms "lower alkyl" and "lower alkoxy" are used to denote alkyl and alkoxy groups respectively containing from 1 to 4 carbon atoms.

As examples of substituents which may be present in the benzene ring T there may be mentioned chlorine or bromine atoms or nitro, cyano, lower alkyl, lower alkoxy, lower alkylsuphonyl, carbo lower alkoxy, carbonamido, sulphonamido, acetyl, phenyl or phenoxy groups.

As examples of the lower alkyl radicals represented by R and Z or which may be present in the benzene ring T there may be mentioned ethyl, propyl, butyl and preferably methyl radicals. As examples of the lower alkoxy radicals which may be present in the benzene ring T there may be mentioned ethoxy, propoxy and preferably methoxy radicals. As examples of lower alkylsulphonyl and carbo lower alkoxy groups which may be present in the benzene ring T there may be mentioned methylsulphonyl, ethylsulphonyl, n-propylsulphonyl, carbomethoxy, carboethoxy and carbobutoxy groups. The carbonamido and sulphonamido groups, which may be present in the benzene ring T include N-lower alkyl and N:N-di(lower alkyl) derivatives thereof, such as carbo-N-methylamido, carbo-N:N-dimethylamido, sulphon-N-methylamido and sulphon-N:N-dimethylamido groups.

According to a further feature of the invention there is provided a process for the manufacture of the water-insoluble styryl dyestuffs, as hereinbefore defined, which comprises reacting with malonodinitrile an aldehyde of the formula:

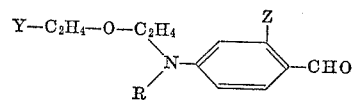

Formula I wherein R, Y and Z have the meanings stated.

The process of the invention may be conveniently brought about by stirring the reactants together in an organic solvent, such as methanol, and in the presence of a basic compound, such as ammonia or a secondary amine such as diethylamine or piperidine or an alkali metal derivative of an alcohol such as the sodium derivative of methanol or ethanol, the reaction being carried out at a temperature between 20° C. and the boiling point of the organic solvent. The dyestuff so obtained is then isolated by conventional methods, for example by filtering off the precipitated dyestuff, or by removing the organic solvent by distillation, or by adding a liquid, such as water, which precipitates the dyestuff from the solution in the organic solvent.

The aldehydes of Formula I may themselves be obtained, for example, by reacting a compound of the formula:

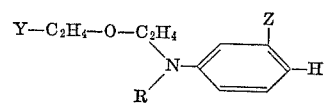

Formula I with phosphorous oxychloride in dimethylformamide.

The compounds of Formula II can, for example, be obtained by reacting a compound of the formula:
Y—$C_2H_4$—O—$C_2H_4$Cl with an N-substituted aniline of the formula:

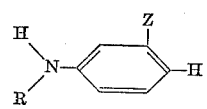

As specific examples of the aldehydes of Formula I which may be used in the process of the invention there may be mentioned 4-{N-ethyl-N-[β-(β'-{N'phenylcarbamoyloxy}ethoxy)-ethyl]amino}-2-methylbenzaldehyde,
4-{N-methyl-N-[β-(β'-{N'-phenylcarbamoyloxy}ethoxy)ethyl]amino}benzaldehyde,
4-{N-ethyl-N-[β-(β'-phenoxyethoxy)ethyl]amino}-2-methylbenzaldehyde and
2-methyl-4-{N-methyl-N-[β-(β'-{p-phenylphenoxy}-ethoxy)ethyl]amino}benzaldehyde.

A preferred class of the styryl dyestuffs of the invention comprises the dyestuffs of the formula:

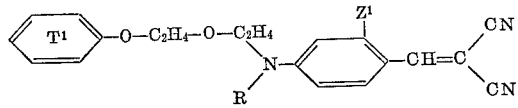

wherein R and $Z^1$ each independently represent lower alkyl radicals, and the benzene ring $T^1$ may contain substituents other than sulphonic acid and carboxylic acid groups.

The dyestuffs, as hereinbefore defined, are valuable for colouring synthetic textile materials, for example cellulose acetate textile materials such as secondary cellulose acetate and celulose triacetate textile materials, polyamide textile materials such as polyhexamethyleneadipamide textile materials, and preferably aromatic polyester textile materials such as polyethylene terephthalate textile materials. Such textile materials can be in the form of thread, yarn, or woven or knitted fabric.

Such textile materials can conveniently be coloured with the dyestuffs, as hereinbefore defined, by immersing the textile materials in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile material it is preferred to carry out the dyeing process at a temperature between 60° and 85° C.; in the case of cellulose triacetate or polyamide textile materials it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C., under superatmospheric pressure.

Alternatively the aqueous dispersion of the said dyestuff can be applied to the textile material by a padding or printing process, followed by heating or steaming of the textile material. In such processes it is preferred to incorporate a thickening agent, such as gum tragacanth, gum arabic or sodium alginate, into the aqueous dispersion of the said dyestuff.

At the conclusion of the colouring process it is preferred to give the coloured textile material a rinse in water or a brief soaping treatment before finally drying the coloured textile material. In the case of aromatic polyester textile material it is also preferred to subject the coloured textile material to a treatment in an alkaline aqueous solution of sodium hydrosulphite before the soaping treatment in order to remove loosely attached dyestuff from the surface of the textile material.

The styryl dyestuffs of the invention have excellent affinity and build-up properties on synthetic textile materials, and in particular on aromatic polyester textile materials, so enabling deep shades to be obtained. The resulting colorations, which range in shade from greenish-yellow to orange, have excellent fastness to light, to wet treatments, and, in particular, to dry heat treatments such as those carried out at high temperatures during pleating operations.

The invention is illustrated but not limited by the following examples in which the parts are by weight.

Example 1

A mixture of 3.7 parts of 2-methyl-4-{N-ethyl-N-[β - (β'{N' - phenylcarbamoyloxy}ethoxy)ethyl]amino}benzaldehyde, 0.7 part of malonodinitrile, 0.01 part of piperidine and 10 parts of ethanol is stirred for 2 hours at the boil under a reflux condenser. The resulting solution is cooled to 10° C. and the ω:ω-dicyano-2-methyl-4-{N - ethyl - N[β - (β'-{N'-phenylcarbamoyloxy}ethoxy)ethyl]amino}styrene which separates out is filtered off and dried.

When dispersed in aqueous medium the dyestuff so obtained dyes polyester and cellulose triacetate textile materials in bright yellow shades possessing excellent fastness to light and to wet treatments.

The 2 - methyl - 4 - {N - ethyl - N - [β-(β'-{N-phenylcarbamoyloxy}ethoxy)ethyl]amino}benzaldehyde used in the above examples was itself obtained as follows:

8 parts of phosphorous oxychloride were added to 20 parts of dimethylformamide, the temperature of the mixture being maintained below 10° C. by external cooling. A solution of 17.1 parts of N-{β-[β'-(N-phenylcarbamoyloxy)ethoxy]ethyl}N-ethyl-m-toluidine in 25 parts of dimethylformamide was then added gradually while the temperature of the mixture was maintained below 15° C. by external cooling. The mixture was then slowly heated to 95° C. and maintained at this temperature for 8 hours. The mixture was then cooled, poured into a mixture of ice and water and sodium hydroxide added until the mixture was no longer acid to litmus. The mixture was stirred for 2 hours and the precipitated 2-methyl-4-{N-ethyl - N - [β-(β'-{N'-phenylcarbamoyloxy}ethoxy)ethyl]amino}benzaldehyde was then filtered off, washed with water and dried.

The N - ethyl - N - [β(β'{N' - phenylcarbamoyloxy}ethoxy)ethyl]-m-toluidine was itself obtained by condensing phenylisocyanate with N-ethyl-N-[β(β' - hydroxyethoxy)ethyl]-m-toluidine, which was itself prepared by condensing N-ethyl-N-(β - chloroethyl)-m-toluidine with the monosodium salt of ethylene glycol.

The following table gives further examples of the water-insoluble styryl dyestuffs of the invention having the formula:

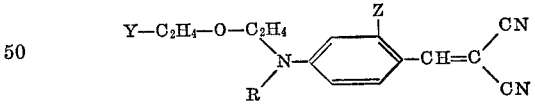

the symbols of which have the values given in the respective columns of the table. All these dyestuffs gave bright yellow shades when applied to aromatic polyester textile materials.

The said dyestuffs were obtained, using methods similar to that described in Example 1, by condensing malonodinitrile with the appropriate aldehyde of the formula:

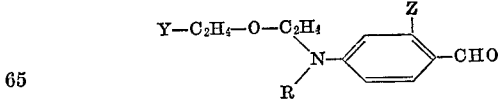

These aldehydes were themselves obtained by reacting with phosphorous oxychloride in dimethylformamide medium (using methods similar to that described in the second last paragraph of Example 1 for the preparation of the aldehyde used in that example) the amines which were obtained by reacting N-methyl-m-toluidine or N-methylaniline with the chloro compounds listed in the fifth column of the table.

| Example | Y | R | Z | Chloro compound |
|---|---|---|---|---|
| 2 | p-Cyanophenoxy | Methyl | Methyl | β-(p-cyanophenoxy) ethyl-β'-chloroethyl ether. |
| 3 | o-Cyanophenoxy | do | do | β-(o-cyanophenoxy) ether-β'-chloroethyl ether. |
| 4 | o-Nitrophenoxy | do | do | β-(o-nitrophenoxy) ethyl-β'-chloroethyl ether. |
| 5 | p-Nitrophenoxy | do | do | β-(p-nitrophenoxy) ethyl-β'-chloroethyl ether. |
| 6 | 2:4-dibromophenoxy | do | do | β-(2:4-dibromophenoxy) ethyl-β'-chloroethyl ether. |
| 7 | 2:4-dichlorophenoxy | do | do | β-(2:4-dichlorophenoxy) ethyl-β'-chloroethyl ether. |
| 8 | do | do | Hydrogen | Do. |
| 9 | p-Bromophenoxy | do | Methyl | β-(p-bromophenoxy) ethyl-β'-chloroethyl ether. |
| 10 | p-Acetylphenoxy | do | do | β-(p-acetylphenoxy) ethyl-β'-chloroethyl ether. |
| 11 | p-Carbomethoxyphenoxy | do | do | β-(p-carbomethoxyphenoxy) ethyl-β'-chloroethyl ether. |
| 12 | p-Carbo-N:N-dimethyl-amidophenoxy. | do | do | β-(p-carbo-N:N-dimethylamidophenoxy)-β'-chloroethyl ether. |
| 13 | p-Methylsulphonylphenoxy | do | do | β-(p-methylsulphonylphenoxy)-β'-chloroethyl ether. |
| 14 | p-Sulphon-N:N-dimethyl-amidophenoxy. | do | do | β-(p-sulphon-N:N-dimethylamidophenoxy)-β'-chloroethyl ether. |
| 15 | p-Phenylphenoxy | do | do | β-(p-phenylphenoxy) ethyl-β'-chloroethyl ether. |
| 16 | o-Phenylphenoxy | do | do | β-(o-phenylphenoxy) ethyl-β'-chloroethyl ether. |
| 17 | p-Phenoxyphenoxy | do | do | β-(p-phenoxyphenoxy) ethyl-β'-chloroethyl ether. |
| 18 | o-Phenoxyphenoxy | do | do | β-(o-phenoxyphenoxy) ethyl-β'-chloroethyl ether. |
| 19 | Naphth-1-yloxy | do | do | β-(naphth-1-yloxy) ethyl-β'-chloroethyl ether. |
| 20 | Naphth-2-yloxy | do | do | β-(naphth-2-yloxy) ethyl-β'-chloroethyl ether. |
| 21 | Phenoxy | do | do | β-phenoxyethyl-β'-chloroethyl ether. |
| 22 | o-Chlorophenoxy | do | do | β-(o-chlorophenoxy) ethyl-β'-chloroethyl ether. |
| 23 | p-Chlorophenoxy | do | do | β-(p-chlorophenoxy) ethyl-β'-chloroethyl ether. |
| 24 | 4-chloro-5-methylphenoxy | do | do | β-(4-chloro-5-methylphenoxy) ethyl-β'-chlorophenyl ether. |
| 25 | o-Methylphenoxy | do | do | β-(o-methylphenoxy)-β'-chloroethyl ether. |
| 26 | p-Methylphenoxy | do | do | β-(p-methylphenoxy)-β'-chloroethyl ether. |
| 27 | o-Methoxyphenoxy | do | do | β-(o-methoxyphenoxy) ethyl-β'-chloroethyl ether. |
| 28 | o-Nitrophenoxy | do | Hydrogen | β-(o-nitrophenoxy) ethyl-β'-chloroethyl ether. |
| 29 | Phenoxy | do | do | β-phenoxyethyl-β'-chloroethyl ether. |

Example 30

In place of the 3.7 parts of the aldehyde used in Example 1 there are used 3.56 parts of 2-methyl-4-{N-methyl-N-[β-(β'-{N' - phenylcarbamoyloxy}ethoxy)ethyl]amino}benzaldehyde whereby a similar dyestuff is obtained.

The aldehyde used in this example was obtained by the method described in the last two paragraphs of Example 1 except that the N-ethyl-N-(β-chloroethyl)-m-toluidine was replaced by N-methyl-N-(β-chloroethyl)-m-toluidine.

Example 31

In place of the 3.7 parts of the aldehyde used in Example 1 there are used 3.8 parts of 2-methyl-4-{N-ethyl-N - [β - (β'-{phthalimido}ethoxy)ethyl]amino}benzaldehyde or 4.16 parts of 2 - methyl - 4 - {N - ethyl - N - [β-(β' - {o - sulphobenzimido}-ethoxy)ethyl]amino}benzaldehyde whereby similar dyestuffs are obtained.

The aldehydes used in this example were themselves obtained by reacting N-ethyl-N-[β-(β'-chloroethoxyethyl)]-m-toluidine with potassium phthalimide or sodium o-sulphobenzimide respectively and treating the resulting compounds with phosphorous oxychloride in dimethylformamide.

I claim:
1. The water-insoluble styryl dyestuffs of the formula

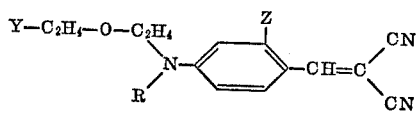

wherein R is a lower alkyl radical; Z is selected from the class consisting of hydrogen and lower alkyl; and Y is a group selected from the class consisting of groups of the formula

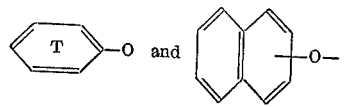

wherein the benzene ring T may contain up to two substituents selected from the group consisting of chlorine, bromine, nitro, cyano, lower alkyl, lower alkoxy, lower alkylsulphonyl, carbo lower alkoxy, unsubstituted carbon amido, carbo-N-lower alkyl-amido, carbo-N:N-di lower alkyl amido, unsubstituted sulphonamido, sulpho-N-lower alkyl-amido, sulpho-N:N-di lower alkyl amido, acetyl, phenyl and phenoxy.

2. The water-insoluble styryl dyestuffs as claimed in claim 1 wherein R and Z are each lower alkyl radicals.

References Cited

UNITED STATES PATENTS 2,850,520   9/1958   Merian et al. -------- 260—465

CHARLES B. PARKER, *Primary Examiner.*

S. T. LAWRENCE, *Assistant Examiner.*

U.S. Cl. X.R.

260—302, 326, 471, 556, 558, 600, 559, 609, 592, 599